(No Model.)

W. I. BUNKER.
BICYCLE.

No. 499,009. Patented June 6, 1893.

Witnesses.
Thos. D. Sheridan
Samuel E. Hibben

Inventor.
William I. Bunker
By Banning and Banning and Payson,
Attorneys.

THE NORRIS PETERS CO., PHOTO-LITHO., WASHINGTON, D. C.

UNITED STATES PATENT OFFICE.

WILLIAM I. BUNKER, OF LA GRANGE, ILLINOIS.

BICYCLE.

SPECIFICATION forming part of Letters Patent No. 499,009, dated June 6, 1893.

Application filed October 15, 1892. Serial No. 448,961. (No model.)

*To all whom it may concern:*

Be it known that I, WILLIAM I. BUNKER, a citizen of the United States, residing at La Grange, Cook county, Illinois, have invented certain new and useful Improvements in Bicycles, of which the following is a specification.

The object of my invention is to make a bicycle or other vehicle, in which the greatest leverage will be presented to the action of the rider at the moment he exerts his weight on the pedals, and which will utilize his weight to assist in the propulsion of the vehicle; and my invention consists in the features, arrangements and combination hereinafter described and claimed.

Figure 1:
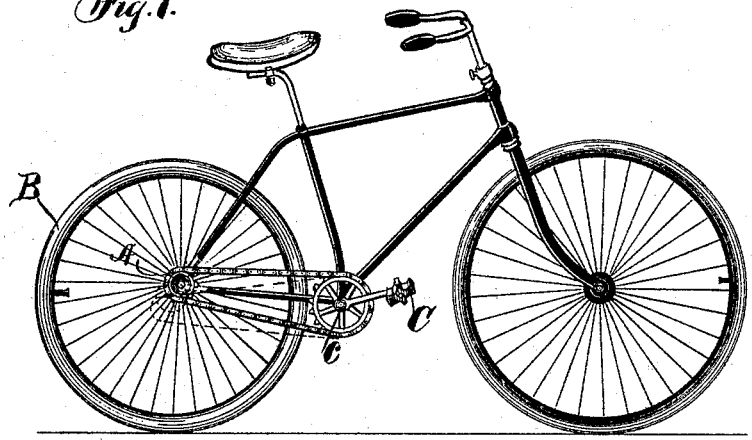
Figure 2:
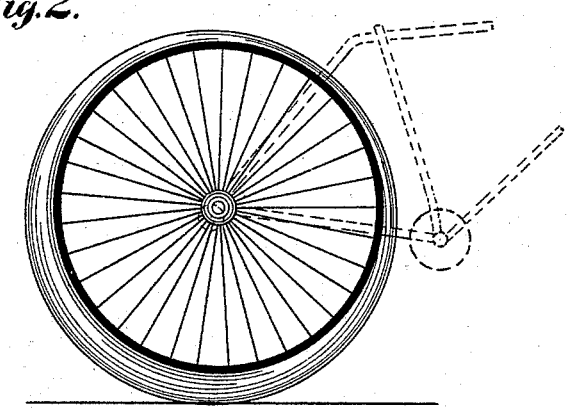

In the drawings, Figure 1 is a side elevation of my improvement applied to a bicycle; and Fig. 2 is a side elevation of a portion of a bicycle showing a modified arrangement.

In making my improved bicycle or other vehicle, I arrange the shaft, A, which carries the sprocket wheel at one side of the true center of the figure of the driving wheel B. This mades the spokes of the wheel longer at one side of the shaft than at the other. I arrange the pedals C on the pedal shaft c, so that when the shaft of the driving wheel is at its greatest height from the surface on which the wheel is rolling, the pedals are in that position in their down stroke in which they afford the greatest leverage for the weight and action of the rider. I have shown the pedals in that position in Fig. 1 of the drawings. The pedals are therefore in the most advantageous position for the rider at the time the greatest leverage is presented from the fulcrum or surface on which the vehicle is rolling. At this instant, the rider is also in his most elevated position, so that his weight and muscular action bearing on the pedals impart an accelerated motion to the vehicle, like that secured by a downward inclination of the surface over which the vehicle is traveling. As the wheel in its revolution passes around to bring its shaft to its lowest position, as shown in dotted lines in Fig. 1, there is presented the shortest leverage or distance between the fulcrum and the shaft, so that the pedal will more rapidly pass around this portion of its course and raise the rider again to his most elevated position. There will therefore constantly be an alternation of long and short leverages, with the long leverage always presented at the time where it can be utilized to the greatest advantage for speed. In Fig. 2, I have shown a modified arrangement for securing the same result. In this case, I have provided the rim of the driving wheel with a tire thickened at one portion of its periphery, so that the shaft of the driving wheel will be at a point eccentric from the true center of the figure of the wheel. The same result may be obtained by providing the wheel with a tire, harder or more dense through one portion of its circumference than at the opposite side, so that in action the shaft of the driving wheel will become eccentric to the true figure of the wheel, as in the other cases as the softened portion of the tire is under pressure.

I may say here, that I have shown or mentioned these various ways in which the result desired may be secured, because I do not propose to limit myself to specific methods, as I consider that my invention consists principally in the idea of arranging the shaft of the driving wheel at a point eccentric from the true center of the figure of the wheel, or so as to become eccentric in action, and arranging the pedals in relation to the position of the shaft of the wheel so that they will be at the point of the greatest leverage when the rider desires to act on them by his weight and muscular action. I may also say that when I use the term "eccentric," I mean to include elliptical forms as well, and that when I use the term "driving wheel," I mean it to be understood in the singular or plural number as my invention may be applied to a bicycle, tricycle, or other vehicle, and that I do not mean by the use of such term to prevent myself from making the other wheels of the vehicle like the driving wheel in form or action, if I so desire.

What I regard as new, and desire to secure by Letters Patent, is—

1. As a new article of manufacture, a vehicle having its driving wheel with its axis of rotation alternately approaching and receding from the surface on which the wheel is rolling, in combination with propelling mechanism having pedals to be actuated by the muscular action and weight of the rider for increasing the speed of the vehicle, substantially as described.

2. As a new article of manufacture, a wheel for vehicles comprising a hub, a rim held at unequal distances from the hub at different points, and spokes of unequal length radiating from the hub and connecting the hub and rim, substantially as described.

3. In a vehicle, the combination of a driving wheel eccentrically mounted on its bearings, and pedals by which it is rotated and controlled, substantially as described.

WILLIAM I. BUNKER.

Witnesses:
SAMUEL E. HIBBEN,
THOS. F. SHERIDAN.